United States Patent [19]

Triebel

[11] 4,191,526
[45] Mar. 4, 1980

[54] SUSPENSION GAS PREHEATER

[75] Inventor: Wolfgang Triebel, Oelde, Fed. Rep. of Germany

[73] Assignee: Polysius AG, Neubeckum, Fed. Rep. of Germany

[21] Appl. No.: 892,739

[22] Filed: Apr. 3, 1978

[30] Foreign Application Priority Data

Apr. 7, 1977 [DE] Fed. Rep. of Germany ....... 2715790

[51] Int. Cl.² .............................................. F27B 15/00
[52] U.S. Cl. ...................... 432/58; 432/106; 34/57 R
[58] Field of Search .......................... 432/58, 106, 15; 106/100; 34/57 A, 57 R

[56] References Cited

U.S. PATENT DOCUMENTS

| | | | |
|---|---|---|---|
| 2,538,833 | 1/1951 | DeRycke | 34/57 A |
| 3,309,785 | 3/1967 | King | 34/57 R |
| 3,836,323 | 9/1974 | Engel | 432/58 |
| 3,881,861 | 5/1975 | Ritzmann | 34/57 R |
| 4,039,277 | 8/1977 | Kobayashi et al. | 432/106 |
| 4,096,642 | 6/1978 | Triebel | 432/106 |
| 4,119,396 | 10/1978 | Abelitis et al. | 34/57 R |

Primary Examiner—Henry C. Yuen
Attorney, Agent, or Firm—Jones, Thomas & Askew

[57] ABSTRACT

A suspension gas preheater (hereinafter referred to in short as a suspension preheater) for fine material comprising several heat exchanger stages arranged one above the other through which material passes successively in a downward direction and through which the gas flows upwards in countercurrent thereto, is fitted with an additional heat exchanger stage which is supported alongside the vertical stack of original heat exchanger stages and which is connected to the uppermost original heat exchanger stage by a material feed system.

13 Claims, 2 Drawing Figures

SUSPENSION GAS PREHEATER

BACKGROUND

There are already various types of suspension preheaters in which the individual heat exchanger stages are formed for example by cyclones, vortex chambers or countercurrent chambers, the heat exchanger stages arranged one above the other generally being supported in or on a tower-like framework.

These known suspension preheaters have generally proved to be satisfactory in practice. However, for reasons associated with process or operations technology, another preheating stage occasionally has to be added to suspension preheaters of the standard type which, in many cases, involves considerable structural alterations, for static reasons, to the supporting framework and also undesirably long stoppages of an entire fine material treatment plant, particularly where modifications have to be made to already existing preheaters.

Accordingly, it is an object of the present invention to provide a suspension preheater of the type referred to above which can be extended in a structurally simple manner.

SUMMARY OF THE INVENTION

According to the invention, this object is achieved in that, looking in the direction of flow of the gas, the uppermost heat exchanger stage is followed by another heat exchanger stage which is arranged alongside the vertically adjacent heat exchanger stages and which communicates with the uppermost heat exchanger stage through a material feed system.

In this way, there is no need for the standard construction of conventional suspension preheaters with the heat exchanger stages arranged one above the other to be modified, instead the extra heat exchanger stage is merely associated with the uppermost heat exchanger stage (of the normal construction) by being set up alongside the existing heat exchanger stages arranged one above the other like a tower. An embodiment such as this is of particular advantage in cases where it is intended to add an extra heat exchanger stage to an already existing preheater because, in this case, the framework accommodating the extra heat exchanger stage can be set up without any modifications to the existing framework (for the heat exchanger stages arranged one above the other), in addition to which this extra heat exchanger stage can be assembled without any significant interruption in the operation of the already existing heat exchanger, because the necessary connection of the pipes (between the existing heat exchangers and the extra heat exchanger stage) only requires a reasonable, relatively short stoppage time.

Since the extra heat exchanger stage is preferably set up below and alongside the group of vertically adjacent heat exchanger stages, the transport of material between this extra heat exchanger stage and the uppermost heat exchanger stage (looking in the direction of flow of the gas) can be carried out by means of a suitable material feed system which may optionally be provided with a simple thermal insulation on those of its surfaces which come into contact with the material, although the fine material preheated in this extra heat exchanger stage is preheated by the gas for the first time in that stage and, as a result, is not yet overmoderately warm.

By arranging the extra heat exchanger stage below and alongside the vertically adjacent heat exchanger stages, it is possible in many cases either to manage without the vertical feed system required for loading the uppermost heat exchanger stage or considerably to reduce its overall delivery height. In cases where the vertical feed system is redundant, it may even be used for feeding material between the above-mentioned uppermost heat exchanger stage and the extra heat exchanger stage, thereby reducing costs to a considerable extent.

The material feed system used in accordance with the invention is preferably a pneumatic feed system, advantageously in the form of a continuous pneumatic vertical feeder comprising a feed vessel. A vertical feed system of this type can be used extremely economically in terms of the space which it occupies.

DETAILED DESCRIPTION

Figure 1:
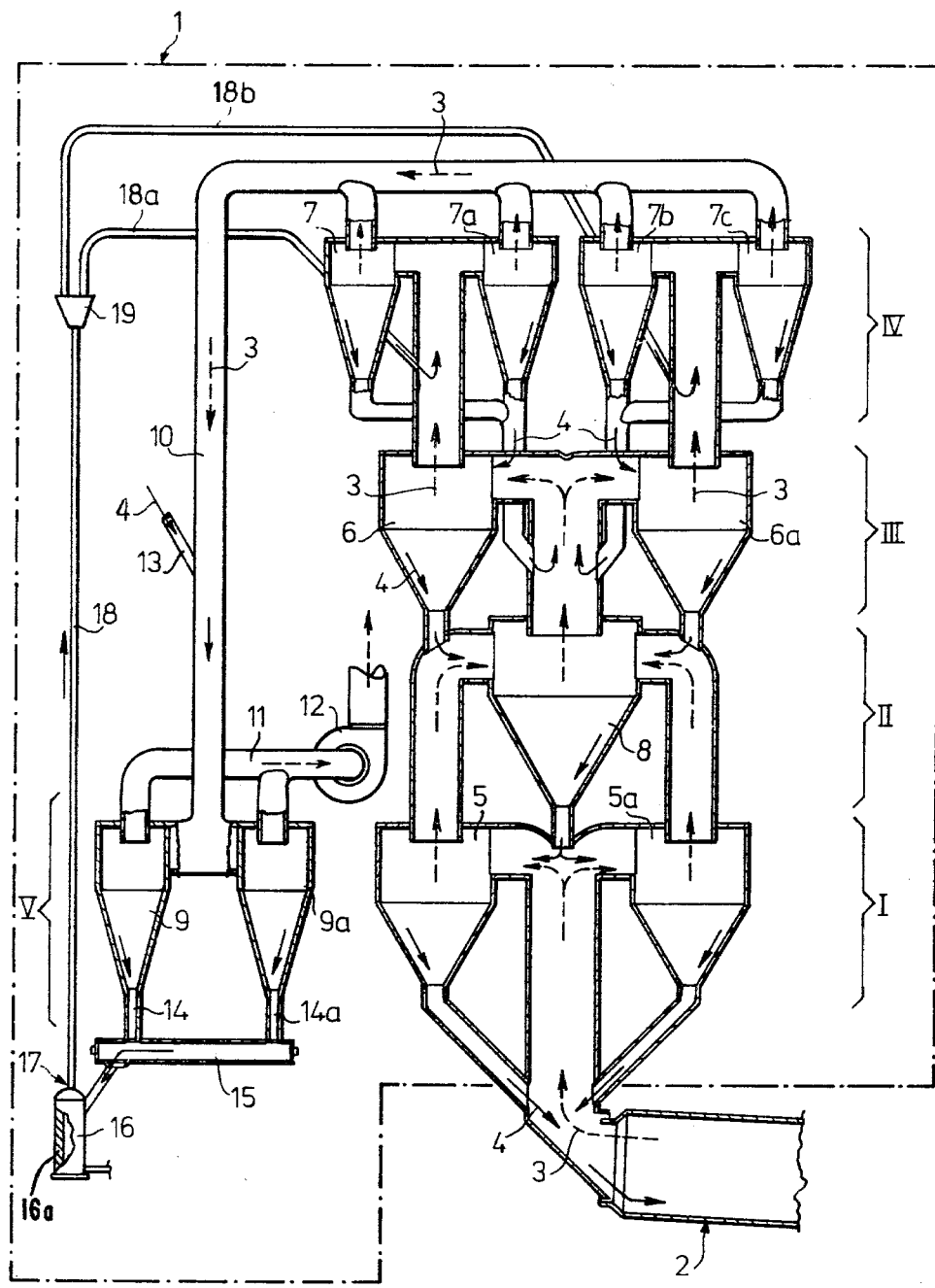
FIG. 1 is a general view of a first embodiment of the suspension preheater according to the invention with four heat exchanger stages formed by cyclones and vortex chambers arranged one above the other and with a fifth heat exchanger stage containing cyclones and arranged alongside the vertically adjacent heat exchanger stages.

The suspension preheater 1 shown in FIG. 1 is used for preheating fine material, for example cement raw mix, which after preheating is intended to be further treated, for example calcined, in a rotary kiln 2 following the preheater.

This suspension preheater 1 contains four heat exchanger stages I, II, III and IV arranged one above the other through which the hot gas coming from the rotary kiln 2 ascends successively in that order, whereas the fine material to be preheated descends through the four stages in countercurrent to the gas, as indicated by chain-line arrows 3 (for the gas) and solid-line arrows 4 (for the fine material). The suspension preheater 1 described thus far is one of the standard constructions in which the four vertically adjacent heat exchanger stages I, II, III, IV are formed by cyclones 5, 5a, 6, 6a, 7, 7a, 7b, 7c (for the heat exchanger stages I, III and IV) and by a vortex chamber 8 (for the heat exchanger stage II). These heat exchanger stages I, II, III and IV formed by cyclones and the vortex chamber communicate with one another through their material and gas pipes, as shown in the drawing.

According to the present invention, a fifth heat exchanger stage (V) is arranged alongside the group of vertically adjacent heat exchanger stages I, II, III and IV. In the present case, this fifth heat exchanger stage (V) comprises two cyclones 9, 9a which are arranged substantially alongside the lowermost heat exchanger stage I of the vertically adjacent heat exchangers. These two cyclones 9, 9a of the additional heat exchanger stage (V) communicate through a common gas pipe 10 with the cyclones 7, 7a, 7b and 7c of the uppermost heat exchanger stage IV (looking in the direction of flow of the gas). The waste gas leaving the two cyclones 9, 9a of the additional heat exchanger stage V through their dip pipes is delivered through a common pipe 11 to a fan 12 which delivers it in known manner to a dust extractor (not shown in detail).

A material feed tube 13, through which fresh fine material (for example cement raw mix to be preheated) is delivered to the suspension preheater 1 (cf. arrow 4), is connected to the gas pipe 10 coming from the uppermost heat exchanger stage IV of the vertically adjacent heat exchangers and leading to the cyclones 9, 9a of the heat exchanger stage V. The fine material which is mildly preheated in this additional heat exchanger stage V leaves the cyclones 9, 9a through their material dischange pipes 14, 14a which are connected to the feed vessel 16 of a pneumatic vertical feeder 17, in the present case by the interposition of a feed screw 15. The feed pipe 18 extending vertically upwards from the feed vessel 16 contains in its upper section (preferably at about the level of the uppermost heat exchanger stage IV) a pipe manifold 19 from which branch pipes 18a and 18b extend respectively to the pair of cyclones 7, 7a and to the pair of cyclones 7b, 7c of the uppermost heat exchanger stage IV so that the fine material preheated in the heat exchanger stage IV after initial contact with the gas is delivered to this uppermost heat exchanger stage IV.

In order to reduce the thermal stressing of the pneumatic feeder 17 to a reasonable level, those parts of the pneumatic feeder 17 which comes into contact with the preheated fine material may be lined with tamped insulating compound 16a (for example by extrusion). In addition, the gas pipe 10 may also be suitably insulated in order largely to avoid a loss of heat in the region between the uppermost heat exchanger stage IV and the additional heat exchanger stage V arranged below.

Figure 2:
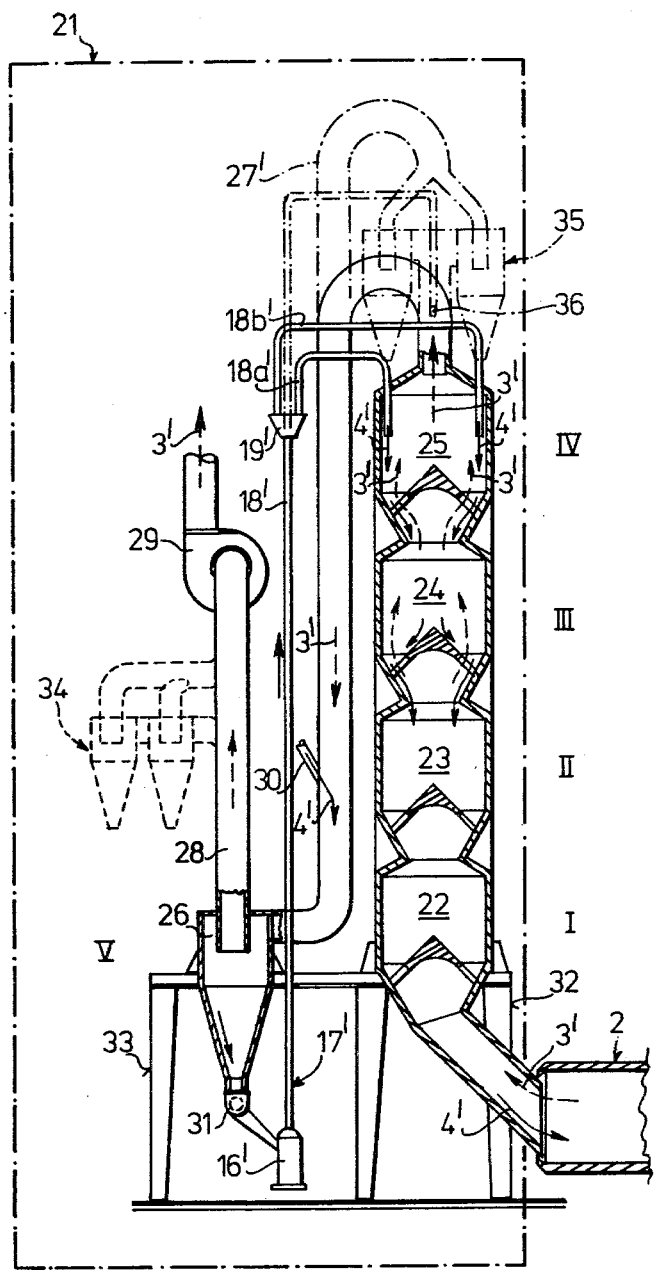
FIG. 2 is a general view of a second embodiment of the invention with countercurrent heat exchanger chambers arranged one above the other and an extra heat exchanger stage with at least one cyclone provided below and alongside these vertically adjacent heat exchangers.

A second embodiment of the suspension preheater according to the invention is shown in FIG. 2 and is generally denoted by the reference numeral 21. In this embodiment, four heat exchanger stages I, II, III and IV are again arranged one above the other in known manner, these four heat exchanger stages being respectively formed by countercurrent heat exchanger chambers 22, 23, 24 and 25. These four countercurrent heat exchanger chambers are placed self-supportingly one above the other like a tower in known manner, comprising constrictions and baffles at their points of connection, as can clearly be seen from FIG. 2.

The hot waste gas coming from the rotary kiln 2' following the preheater 21 (cf. chain line arrows 3') is again used for preheating the fine material passing downwards through the four vertically adjacent heat exchanger stages I, II, III and IV (cf. solid-line arrows 4'), this hot waste gas flowing upwards through the vertically adjacent heat exchanger chambers 22, 23, 24 and 25 in countercurrent to the fine material.

In this embodiment, too, an additional heat exchanger stage V which preferably comprises two cyclones 26 connected in parallel (which lie one behind the other in the plane of FIG. 2, so that only one is visible), is arranged alongside the group of vertically adjacent heat exchanger stages I, II, III and IV and, more particularly, alongside the lowermost heat exchanger stage I or alongside the lowermost heat exchanger chamber 22. The uppermost heat exchanger stage IV or the uppermost heat exchanger chamber 25 (looking in the direction of flow of the gas) is also connected by its waste gas pipe 27 to the two cyclones 26 of the additional heat exchanger stage V and the common waste gas pipe 28 of the cyclones 26 may then be connected in the usual way by a fan 29 to a dust extractor (not shown).

In this embodiment of the invention, too, a feed tube 30 for introducing fine material to be preheated into the heat exchanger 21 is connected to the gas pipe 27. The fine material initially preheated in the cyclones 26 of the additional heat exchanger stage V is then delivered to the feed vessel 16' of a pneumatic vertical feeder 17', preferably through an intermediate feed screw 31 in the same way as in the first embodiment shown in FIG. 1, and the fine material preheated for the first time is delivered upwards through the rising pipe 18' of the vertical feeder and is again preferably introduced into the uppermost heat exchanger chamber 25 (heat exchanger stage V) of the vertically adjacent heat exchanger stages at two points through a pipe manifold 19' and branch pipes 18a', 18b'.

As shown in FIG. 2, the vertically adjacent heat exchanger chambers 22, 23, 24 and 25 of the heat exchanger stages I to IV are supported by a common main framework 32. A secondary framework 33 built directly onto the main framework 32 is provided for the two cyclones 26 of the heat exchanger stage V which are arranged adjacent the lowermost heat exchanger chamber 22. In this way, a main framework provided for the standard four-stage heat exchanger construction requires hardly any modification where it is intended to add an extra heat exchanger stage (in this case the heat exchanger stage V) to an already existing suspension heat exchanger of the type in question. Accordingly, all that is necessary for accommodating the extra heat exchanger stage is the structurally and statically extremely simple addition of a secondary framework (in this case the secondary framework 33).

As shown in FIG. 2, it is possible in a first variant of this embodiment for a dust extractor 34 formed by cyclones or other equivalent means to be built into the waste gas pipe 28 coming from the cyclones 26, so that an at least preliminary removal of dust can take place before the fan 29 is reached. The fine material deposited in this dust extractor 34 could then be returned to the cyclones 26 (possibly together with the freshly introduced fine material).

Another variant of this second embodiment is indicated in dash-dot lines in FIG. 2 above the uppermost countercurrent heat exchanger chamber 25. In this case, a dust extraction cyclone 35 may be directly arranged on the uppermost countercurrent heat exchanger chamber 25 to which it may be connected by material and gas pipes. The waste gas pipe 27' coming from this dust extraction cyclone 35 is in turn connected to the gas pipe 27 leading to the cyclones 26 of the extra heat exchanger stage V. In this case, the pipe manifold 19' could be dispensed with because, as can be seen from the drawing, a single material inlet 36 is sufficient.

It is obvious that a main framework may also be provided for the four vertically adjacent heat exchanger stages I to IV of the embodiment shown in FIG. 1, in which case a secondary framework may again be built onto the main framework for accommodating the extra heat exchanger stage V. In addition, the extra heat exchanger stage V in both embodiments may of course also contain only one cyclone or more than two cyclones or even any other equivalent apparatus (for example a vortex chamber).

While this invention has been described in detail with particular reference to preferred embodiments thereof, it will be understood that variations and modifications can be effected within the spirit and scope of the invention as described hereinbefore and as defined in the appended claims.

I claim:

1. In a suspension gas preheater for preheating fine material, including a plurality of heat exchanger stages arranged one above the other in a stack through which material passes successively in a downward direction from one stage to a lower stage and through which gas flows upwards successively from one stage to a higher stage, wherein the plurality of heat exchanger stages includes an uppermost stage and a lowermost stage, the improvement therein comprising:

at least one additional heat exchanger stage positioned laterally adjacent the stack of the plurality of heat exchanger stages;

means for moving gas from the uppermost stage of the plurality of heat exchanger stages to and through said additional heat exchanger stage; and a material feed system connecting said additional heat exchanger stage with the uppermost stage of the plurality of heat exchanger stages and including means for moving materials from said additional heat exchanger stage to the uppermost stage, whereby the general direction of movement of gas is from the lowermost stage through the plurality of heat exchanger stages to said additional heat exchanger stage and the general direction of movement of materials is from said additional heat exchanger stage through the the plurality of heat exchanger stages to the lowermost stage.

2. A suspension preheater as claimed in claim 1, wherein said material feed system is a pneumatic material feed system.

3. A suspension preheater as claimed in claim 2, wherein said pneumatic material feed system is in the form of a continuous pneumatic vertical feeder comprising a feed vessel.

4. A suspension preheater as claimed in claim 2 or 3, characterised in that those parts of the pneumatic feeder which come into contact with the preheated fine material are lined with a tamped insulating compound.

5. A suspension preheater as claimed in claim 1, wherein said additional heat exchanger stage contains at least one cyclone separator.

6. A suspension preheater as claimed in claim 1, wherein said additional heat exchanger stage is followed in the direction of gas flow by a dust extractor.

7. A suspension preheater as claimed in claim 1, wherein said means for moving gas includes a thermally insulated gas pipe connecting the uppermost heat exchanger stage of the plurality of heat exchanger stages to said additional heat exchanger stage.

8. A suspension preheater as claimed in claim 1, further comprising a common framework including a main framework supporting the plurality of heat exchanger stages in a vertical stack, and a secondary framework supporting said additional heat exchanger stage laterally adjacent said vertical stack.

9. In a suspension gas preheater for fine material comprising a plurality of heat exchanger stages including at least an uppermost stage and a lowermost stage arranged one above the other through which the material passes successively in a generally downward direction from a materials inlet in the uppermost stage through the uppermost stage to and through the lowermost stage, and through which heated gas flows generally upward from a gas inlet in the lowermost stage through the lowermost stage to and through the uppermost stage and out a gas outlet in the uppermost stage, the combination therewith of:

an additional heat exchanger stage positioned laterally adjacent the plurality of heat exchanger stages, said additional stage including a materials outlet positioned at least as low as the materials inlet of the uppermost stage of the plurality of heat exchanger stages and a gas inlet positioned at least as low as the gas outlet of the uppermost stage;

conduit means connected between said gas inlet of said additional heat exchanger stage and the gas outlet of the uppermost stage of the plurality of heat exchanger stages;

fan means in communication with said additional heat exchanger stage for inducing a flow of gas from the gas outlet in the uppermost stage along said conduit means to and through said additional heat exchanger stage; and material conveyor means arranged to receive the material from said materials outlet of said additional heat exchanger stage and move the material to the materials inlet of the uppermost heat exchanger stage, whereby the direction of materials movement is generally from said additional heat exchanger stage through the plurality of heat exchanger stages to the lowermost stage and the direction of gas movement is generally from the lowermost stage through the plurality of heat exchanger stages to the additional heat exchanger stage.

10. The combination of claim 9 and wherein said material conveyor comprises an auger conveyor arranged to receive the material from said additional heat exchanger, and a pneumatic vertical feeder including a feed vessel arranged to receive the material from said auger conveyor and upwardly extending feed pipe means connected to said feed vessel and in flow communication with the uppermost heat exchanger stage.

11. In a suspension gas preheater for fine material comprising a plurality of heat exchanger stages arranged one above the other and including a lowest stage and an uppermost stage, each said heat exchanger stage including at least one heat exchange chamber comprising a materials inlet, a gas inlet, a gas outlet and a materials outlet, said gas outlet of each said heat exchange chamber with the exception of the heat exchange chamber of said uppermost stage communicating with said gas inlet of the heat exchange chamber of a vertically higher heat exchanger stage, said materials outlet of each said heat exchange chamber with the exception of the heat exchange chamber of said lowest stage communicating with said materials inlet of the heat exchange chamber of a vertically lower stage, said gas inlet of said chamber of said lowest stage communicating with a means for heating and supplying gas, and said materials outlet of said chamber of said lowest stage communicating with a means for collecting materials; the improvement therein comprising:

an additional heat exchanger stage positioned alongside said plurality of heat exchanger stages said additional heat exchanger stage including at least one heat exchange chamber comprising a gas outlet, a materials outlet, a materials inlet in communication with a materials feed, and a gas inlet in communication with said gas outlet of said chamber of said uppermost stage, said materials outlet of said additional heat exchanger stage being positioned at least as low as said materials inlet of said chamber of said uppermost stage and communicating with said materials inlet of said uppermost stage;

gas exhausting means comunicating with said gas outlet of said additional heat exchanger stage for exhausting gas from said additional heat exchanger means whereby hot gasses are drawn from said means for heating and supplying gas successively to said lowest stage, uppermost stage and additional stage; and means for moving materials from said materials feed successively to said additional stage, uppermost stage, lowest stage and means for collecting materials and including a conveyor means for transporting materials from said materials outlet of said additional heat exchanger stage to said materials inlet of said uppermost stage.

12. A suspension preheater as claimed in claim 11 wherein the plurality of heat exchanger stages comprise cyclone separators and at least one vortex chamber.

13. A suspension preheater as claimed in claim 11, wherein the plurality of heat exchanger stages are essentially formed by countercurrent heat exchanger chambers which are directly arranged one on top of the other and which comprise constrictions and baffles at their points of connection.

* * * * *